United States Patent [19]

Verdier

[11] E Re. 30,527

[45] Reissued Feb. 24, 1981

[54] TREAD FOR A GIANT PNEUMATIC RADIAL TIRE

[75] Inventor: Henri Verdier, Puy-de-Dome, France

[73] Assignee: Compagnie Generale des Etablissements Michelin, raison sociale Michelin & Cie, Clermont-Ferrand, France

[21] Appl. No.: 959,577

[22] Filed: Nov. 13, 1978

Related U.S. Patent Documents

Reissue of:

[64] Patent No.: 3,411,559
Issued: Nov. 19, 1968
Appl. No.: 545,972
Filed: Apr. 28, 1966

[51] Int. Cl.[3] ..... B60C 11/06

[52] U.S. Cl. ..... 152/209 R

[58] Field of Search ..... 152/209 R, 209 D, 209 WT, 152/209 NT

[56] References Cited

U.S. PATENT DOCUMENTS

| | | | |
|---|---|---|---|
| D. 188,166 | 6/1960 | Johnson | 152/209 |
| D. 195,077 | 4/1963 | Humphries | D90/20 |
| D. 195,934 | 8/1963 | Wyman et al. | D90/20 |
| D. 196,628 | 10/1963 | Kunz | D90/20 |
| D. 196,701 | 10/1963 | Gestwick | D90/20 |
| D. 196,895 | 11/1963 | Kunz | D90/20 |
| D. 200,691 | 3/1965 | Kunz | D90/20 |
| D. 200,692 | 3/1965 | Kunz | D90/20 |
| 1,400,263 | 12/1921 | Carlisle | 152/209 |
| 2,056,131 | 9/1936 | Brittain | 152/209 |
| 2,094,636 | 10/1937 | Bull | 152/209 |
| 2,501,828 | 3/1950 | Overman | 152/209 |
| 2,551,238 | 5/1951 | Bohannon et al. | 152/209 |
| 3,034,553 | 5/1962 | Barassi | 152/209 |
| 3,087,526 | 4/1963 | Barassi et al. | 152/209 |
| 3,094,157 | 6/1963 | Klöhn | 152/209 |
| 3,104,693 | 9/1963 | Bolenback | 152/209 |
| 3,534,798 | 10/1970 | Ravenhall | 152/209 R |

FOREIGN PATENT DOCUMENTS

| | | |
|---|---|---|
| 398454 | 7/1937 | Canada . |
| 483596 | 5/1952 | Canada . |
| 600768 | 6/1960 | Canada . |
| 1621801 | 2/1951 | Fed. Rep. of Germany . |
| 1040400 | 10/1958 | Fed. Rep. of Germany . |
| 1906393 | 12/1964 | Fed. Rep. of Germany . |
| 537338 | 5/1922 | France . |
| 1028978 | 5/1953 | France . |
| 1357078 | 2/1964 | France . |
| 218555 | 4/1942 | Switzerland . |
| 639279 | 6/1950 | United Kingdom . |
| 744448 | 2/1956 | United Kingdom . |
| 819553 | 9/1959 | United Kingdom . |

OTHER PUBLICATIONS

Mold for "Steeltex 100," 3 pages.
Tire Service Reports from Smithers Laboratories Inc., Sep. 1963 & Feb. 1965 for Firestone Transport 100.
Tire Serivce Reports from Smithers Laboratories Inc., Oct. 1963, for "Cooper Road Master Tire".
Tire Service Report from Smithers Laboratories Inc., for "Gates Cargo Traction Tire", Feb. 1965.
Tire & TBA Review, pp. 42–44, Feb. 1961.
Pneumatic Tire Design, by E. C. Woods.
"Steeltex 100", Transport Topics, Nov. 16, 1964.
Firestone News Service Bulletin, Firestone Steeltex 100, Nov. 5, 1964.
Modern Tire Dealer, Dec. 1964, p. 48.
Transport Topics; p. 40, Nov. 16, 1964.

*Primary Examiner*—Michael W. Ball
*Attorney, Agent, or Firm*—Brumbaugh, Graves, Donohue & Raymond

[57] ABSTRACT

The tread of a giant pneumatic radial tire for use on heavy-duty road vehicles is divided by two wide circumferential grooves into three wide circumferential ribs. The wide ribs are substantially free of grooves therein interrupting their circumferential continuity and of wide circumferential grooves.

6 Claims, 3 Drawing Figures

TREAD FOR A GIANT PNEUMATIC RADIAL TIRE

Matter enclosed in heavy brackets [ ] appears in the original patent but forms no part of this reissue specification; matter printed in italics indicates the additions made by reissue.

This invention relates to improvements in pneumatic tires of the tubeless or tube type and in particular to the tread configuration of tires of the radial carcass type for heavy-duty road service vehicles.

The tread configuration or pattern for pneumatic tires of both the bias ply and radial ply types used for conventional vehicles usually has a plurality of relatively wide and deep grooves extending around the circumference of the tread, these grooves usually being of wavy or zigzag formation and dividing the tread into substantially equal width circumferential ribs. Almost all of such treads have four or five grooves equidistantly spaced across the width of the tread. This type of tread was used in the earliest type of radial carcass tire and has been used in such tires almost universally since.

It has been found that the conventional uniform distribution of the circumferential grooves or even arrangements in which the outermost grooves are spaced more widely from the edges of the tread than the spacing between the grooves is not the best arrangement from the standpoint of wear on the tread or roadability. The tread has a tendency to wear more readily at the edges than in the center and even the presence of relatively wider ribs at the lateral edges of the tread does not overcome this uneven wear.

In accordance with the present invention, an improved tread is provided which distributes the wear on the tread more evenly than the prior treads and at the same time diminishes the overall wear while improving the antiskid properties or road-adherence of the tire.

More particulary, in accordance with the invention, treads for radial carcass tires to be used particularly for vehicles of the heavy duty type include two relatively wide, wavy or zigzag circumferential grooves located on opposite sides of and near the median or equatorial plane of the tire, thereby defining a center zone or rib having a width between about one-fifth and one-half the transverse width of the tread. A spacing between the grooves of about one-third the width of the tread produces optimum results. In addition to the wide grooves, narrower grooves, substantially parallel to the wide grooves, divide the tread into zones of substantially equal width, at least between the wide grooves and the lateral edges of the tread. The wide grooves can be of substantially conventional shape comparable to the shape of the circumferential grooves provided heretofore and their cross-section is preferably V-shaped with the angles of the walls of the groove in the vicinity of 15° in order to resist penetration and retention of foreign objects, such as rocks, sticks and the like. The wavy shape of the grooves circumferentially of the tire may be zigzag or sinuous with the rectilinear sections or the tangents of the curves having a direction of 30° to 36°.

The wide grooves and the narrow grooves in the tread are of substantially equal depth but the narrow grooves have a width which is approximately 0.5 to 1% of the width of the tread as compared with 3% to 6% for the wide grooves. In the new tread, the width of the narrow grooves is between 1 and 2 mm. so that at the ellipse of contact with the road, the outer ends of the grooves will be substantially closed but will open to facilitate cooling of the tire upon leaving the ellipse of contact.

The wider the grooves are not closed at the ellipse of contact and thereby serve to drain any water which is squeegeed off the roads by the inclined edges of the ribs between the grooves.

The road-holding or anti-skid properties of the tire can be improved by forming very narrow slits of short length in the tread ribs and extending generally transversely of the tread. The slits preferably are reversely curved, for example, like a sine wave to improve the squeegeeing action and road-adherence of the tire.

From the foregoing, it will be understood that the tread is divided into three zones of substantial width with other narrower grooves further sub-dividing these zones into narrower ribs of substantially equal width.

It has been found that the rubber present in the wider ribs wears away slower than in the ribs of conventional tires while nevertheless the tire has good road-adherence even on wet roads and is properly cooled by the narrower grooves in the tire.

For a better understanding of the present invention, reference may be had to the accompanying drawings, in which.

Figure 1:
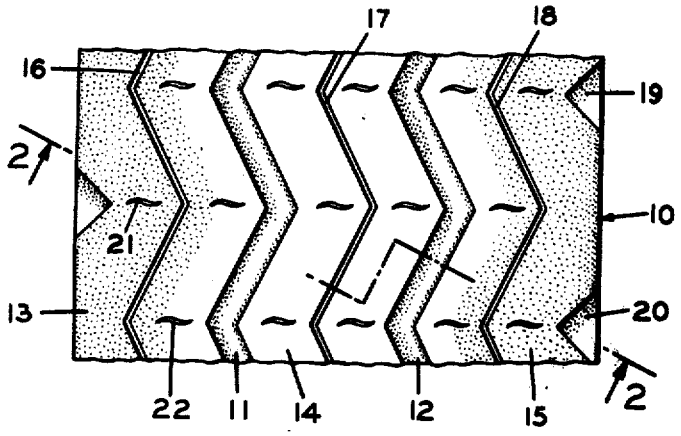
FIG. 1 is a plan view of a portion of a tire tread embodying the present invention.
Figure 2:
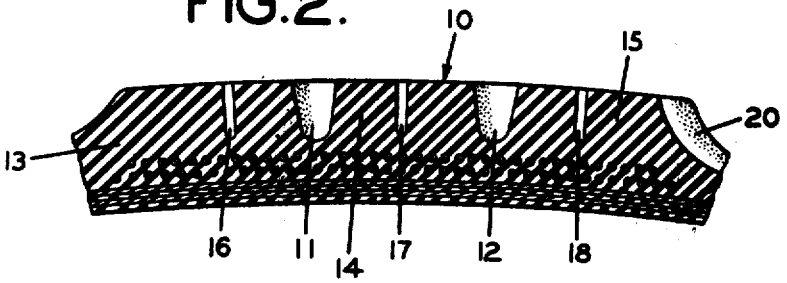
FIG. 2 is a view in section through a tire tread taken on line 2—2 of FIG. 1.
Figure 3:
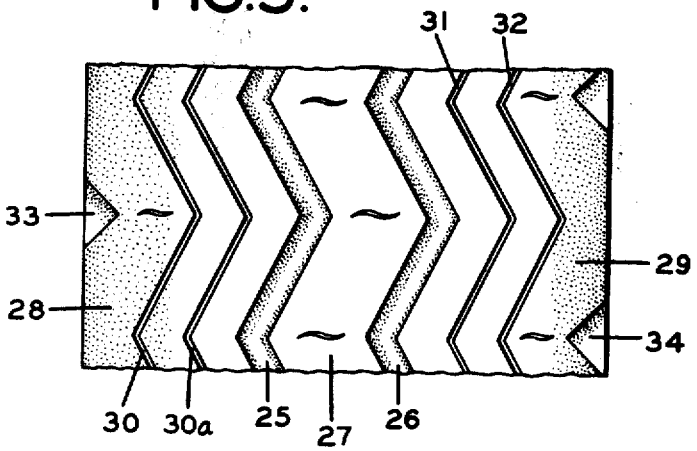
FIG. 3 is a plan view of a modified form of tire tread embodying the present invention.

Referring to FIG. 1 of the drawings, the tire tread 10 is provided with a pair of relatively wide grooves 11 and 12 which are spaced apart about one-third the width of the tire, thereby providing relatively wide ribs 13, 14 and 15 of about equal width extending circumferentially of the tire. In, for example, a tire casing having a tread of a width of approximately 210 mm., the grooves 11 and 12 will be approximately 12½ mm. wide and as shown in FIG. 2 approximately 13½ mm. deep with inwardly converging sidewalls inclined at about 15° to the center plane thereof. On opposite sides of the grooves 11 and 12 are narrower grooves 16, 17 and 18 which further divide the tread 10 into six ribs of substantially equal width. In the exemplary tire, the width of the grooves 16, 17 and 18 is about 1.2 mm. and they have a depth of about 13½ mm. Notches 19, 20 etc. may be provided in the lateral edges of the tread to make the side ribs of substantially the same width as the other ribs inwardly thereof. If desired, the ribs may be provided with a plurality of reversely curved narrow slits 21, 22 etc. to improve the anti-skid or road-holding ability of the tire.

In the modified form of tread disclosed in FIG. 2, two wide zigzag grooves 25 and 26 are disposed on opposite sides of the median or equatorial plane of the tire and are spaced apart about one-fourth to one-fifth the width of the tread. In this way, the center rib 27 between the grooves 25 and 26 is somewhat narrower than the lateral ribs 28 and 29 between the lateral edges of the tread and the grooves 25 and 26. The dimensions of the grooves 25 and 26 may be the same as those of the grooves 11 and 12. Between the groove 25 and the corresponding lateral edge of the tread are a pair of narrower grooves 30 and 30a which divide the rib 28 into substantially equal width ribs. Similar narrow grooves 31 and 32 divide the rib 29 into three ribs of substantially equal width. Edge notches 33, 34 may be provided in the lateral edges or flanks of the tread.

The treads of the type described above, in tests over a distance of over 15,000 km., 5 have shown the following advantages over similar tires having the conventional four-groove type of tread thereon. The new treads have produced a reduction of wear overall of approximately 15%; 20% of the reduced wear being on the edge ribs of the tread and approximately 10% in the center rib, and the road-adherence of antiskid properties of the tire have been improved over similar times with the conventional four-groove tread about 10% to 12% when measured by braking the tires on wet ground. It has been found that by transposing the positions of the grooves 25, 26, for example, with the grooves 30 and 32, the wear on the tire increases considerably as compared with the tread shown in FIGS. 1 and 2. If the grooves 25 and 26 are transposed with the grooves 30a and 31, the wear of the tire tread is less but is still greater than with the arrangement of the grooves disclosed in FIGS. 1 and 2.

It will be understood, of course, that the zigzag type of groove may be replaced with a groove of undulating or curved type and other slit arrangements may be provided for improving road-adherence and squeegeeing action, particularly on wet roads. However, the improved and characteristic feature of the invention is that only two wide grooves are used and are located near the median plane of the tire and are used in conjunction with narrow grooves of a width which causes them to close in the elliptical zone contact with the road.

I claim:

1. A giant pneumatic tire for use on heavy-duty road vehicles having a radial carcass and a tread, said tread having a pair of wide, substantially V-shaped grooves in cross-section extending circumferentially of said tread, said grooves being substantially equally spaced on opposite sides of the median plane of said tire and spaced apart between about one-fifth and one-half of the width of said tread and each said grooves having a width at the surface of said tread substantially 3% to 6% of the width of said tread, said grooves dividing said tread into three circumferential wide ribs, *each of* said ribs being substantially free of grooves therein interrupting the circumferential continuity *over substantially the entire width* thereof and of wide circumferential grooves, *none of said wide ribs having more than two circumferentially continuous narrower grooves of substantial depth.*

2. The tire set forth in claim 1 in which said wide grooves are spaced apart about one-third the width of said tread and said wide ribs are of substantially equal width.

3. The tire set forth in claim 1 comprising a plurality of narrow grooves in said tread extending circumferentially thereof and dividing two of said wide ribs into a plurality of narrower circumferential ribs of substantially equal width between said wide grooves and the edges of said tread.

4. The tire set forth in claim 3 in which said narrow grooves have a width at the surface of said tread of about 0.5% to 1% of the width of said tread.

5. The tire set forth in claim 1 comprising a plurality of narrow grooves extending circumferentially of said tire between said wide grooves and between the edges of said tread and said wide grooves, said wide and narrow grooves being spaced apart substantially equal distances and said wide ribs being divided into circumferentially extending narrower ribs of substantially equal width.

6. The tire set forth in claim 3 in which said wide and narrow grooves are substantially parallel and of wavy configuration circumferentially of said tire.

* * * * *

UNITED STATES PATENT AND TRADEMARK OFFICE

CERTIFICATE OF CORRECTION

PATENT NO. : Re. 30,527
DATED : Feb. 24, 1981
INVENTOR(S) : Henri Verdier

It is certified that error appears in the above-identified patent and that said Letters Patent are hereby corrected as shown below:

First page, the following should be inserted:

[30] Foreign Application Priority Data

Apr. 29, 1965 [FR] France..... 15,254

Signed and Sealed this

*Seventeenth* Day of *November 1981*

[SEAL]

*Attest:*

GERALD J. MOSSINGHOFF

*Attesting Officer*

*Commissioner of Patents and Trademarks*